(12) United States Patent  
Ito et al.

(10) Patent No.: US 6,814,059 B2  
(45) Date of Patent: Nov. 9, 2004

(54) ACCUMULATION TYPE FUEL INJECTION SYSTEM

(75) Inventors: Yoshio Ito, Nagoya (JP); Katsuhiko Takeuchi, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/716,440

(22) Filed: Nov. 20, 2003

(65) Prior Publication Data

US 2004/0099248 A1 May 27, 2004

(30) Foreign Application Priority Data

Nov. 20, 2002 (JP) ........................................ 2002-337085

(51) Int. Cl.[7] .............................................. F02M 41/00
(52) U.S. Cl. ...................................... 123/464; 456/305
(58) Field of Search ................................. 123/305, 295, 123/456, 464, 678, 679, 198 D; 73/119 A

(56) References Cited

U.S. PATENT DOCUMENTS 5,816,220 A * 10/1998 Stumpp et al. ............. 123/435

5,908,022 A * 6/1999 Aoki et al. ............. 123/568.16

FOREIGN PATENT DOCUMENTS

| GB | 2332241 A | * 6/1999 |
| JP | 11-173189 | 6/1999 |

* cited by examiner

Primary Examiner—Mahmoud Gimie  
(74) Attorney, Agent, or Firm—Nixon & Vanderhye P.C.

(57) ABSTRACT

An electronic control unit of an accumulation type fuel injection system increases a number of injections performed by an injector in one injection period from a normal injection number if a pressure difference provided by subtracting target pressure from actual pressure is greater than a determination threshold and conditions for performing the injection are established, or if high-temperature combustion is predicted. If a normal injection mode is a main injection mode, it is changed to a pilot injection mode or a multi-injection mode. If the normal injection mode is the pilot injection mode, it is changed to the multi-injection mode. If the normal injection mode is the multi-injection mode, a number of minute injections is increased. Thus, combustion is slackened and noise caused by the high-temperature combustion can be alleviated.

11 Claims, 9 Drawing Sheets

FIG. 5

|  | NE(rpm) | | | | | | | | |
|---|---|---|---|---|---|---|---|---|---|
| ΔP(Mpa) or NPC(Mpa) or Qfin(mm³/st) | 600 | 1000 | 1400 | 1800 | 2200 | 2600 | | | |
| 0 | | | | | | | | | |
| 5 | | | | | | | | | |
| 10 | | | | | | | | | |
| 15 | | | | | | | | | |
| 20 | | | | | | | | | |
| 25 | | | | | | | | | |
| 30 | | | | | | | | | |
| 35 | | | | | | | | | |
| 40 | | | | | | | | | |
| | | | | | | | | | |
| | | | | | | | | | |
| | | | | | | | | | |

ACCUMULATION TYPE FUEL INJECTION SYSTEM

CROSS REFERENCE TO RELATED APPLICATION

This application is based on and incorporates herein by reference Japanese Patent Application No. 2002-337085 filed on Nov. 20, 2002.

BACKGROUND OF THE INVENTION

1. Field of the Invention

The present invention relates to an accumulation type fuel injection system for injecting high-pressure fuel accumulated in a common rail through injectors.

2. Description of Related Art

An accumulation type fuel injection system calculates an injection quantity of fuel injected from an injector in accordance with an operating state of an engine. For instance, as for a fuel injection quantity during a normal operation, a basic injection quantity is calculated in accordance with an accelerator position and engine rotation speed. Then, a target injection quantity Qfin is calculated by correcting the basic injection quantity in accordance with effects of engine water temperature, a supercharging pressure, the atmospheric pressure, fuel temperature and the like.

As for a pressure in a common rail (a common rail pressure, hereafter), a basic pressure P is calculated in accordance with the target injection quantity Qfin and the engine rotation speed. Then, a target pressure Pfin is calculated by correcting the basic pressure P in accordance with the engine water temperature, the supercharging pressure, the atmospheric pressure, the fuel temperature and the like.

When acceleration is stopped and in consequence the actual common rail pressure NPC becomes higher than the target pressure Pfin, or a pressure difference $\Delta P$ therebetween becomes great, noise is generated by high-temperature combustion. Such noise is generated when a large amount of heat is generated during short-period combustion.

A control device regulates a discharging quantity of the high-pressure fuel discharged by a supply pump, which supplies the high-pressure fuel to the common rail. Thus, the supply pump maintains the common rail pressure at the target pressure Pfin. The supply pump has a function of increasing the common rail pressure to the target pressure Pfin. When pressure reduction of the common rail is required, the supply pump can stop the fuel discharge. However, the supply pump has no function to reduce the common rail pressure actively.

For instance, in deceleration immediately after high-speed travel, fuel injection under a low pressure is required abruptly in a state in which the fuel injection has been performed at high speed and under a high pressure. However, until the common rail pressure is decreased to the low pressure through the fuel injection or fuel leak from the injector, the fuel injection is performed under a condition that the actual common rail NPC is higher than the normally required target pressure Pfin, or under a condition that the pressure difference $\Delta P$ therebetween is large.

Under the condition that the actual pressure NPC is higher than the target pressure Pfin, an injection period is extremely contracted. Thus, the noise is generated in the combustion, in which a large amount of heat is generated in a short period. The generation of the high-temperature combustion is not preferable for performance of the vehicle, too.

As a technology for avoiding the above problem, a technology for mounting a pressure reduction valve to the common rail or a high-pressure fuel pipe for reducing and regulating the common rail pressure is known. Thus, the actual pressure NPC is quickly reduced to the target pressure Pfin by returning the high-pressure fuel accumulated in the common rail to a fuel tank when the target pressure Pfin is decreased rapidly.

As means for reducing the common rail pressure without employing the pressure reduction valve, a technology for driving an electromagnetic valve of the injector to open for a period shorter than a period required to open the injector so that the injector performs an invalid injection is known, for instance, as disclosed in Japanese Patent Application Unexamined Publication No. H11-173189. Thus, the high-pressure fuel flowing into a control chamber of the injector from the common rail is leaked to the fuel tank, so the common rail pressure is reduced.

In the technology using the pressure reduction valve, the pressure reduction valve has to be attached to the common rail or the high-pressure fuel pipe. As a result, mounting performance of the common rail to the vehicle is degraded because of the addition of the pressure reduction valve. Meanwhile, the cost is increased because of the increase in the number of parts or an increase in assembling processes.

In the technology for performing the invalid injection through the injector, the common rail pressure is reduced gradually. Therefore, the actual pressure NPC cannot be reduced to the target pressure Pfin quickly. As a result, the noise is generated by the high-temperature combustion in an early stage of the pressure reduction.

SUMMARY OF THE INVENTION

It is therefore an object of the present invention to provide an accumulation type fuel injection system capable of alleviating noise caused by high-temperature combustion, which is caused when an actual common rail pressure is higher than a target pressure suitable for an operating state, without causing an increase in a number of parts or degradation of mounting performance due to addition of a pressure reduction valve.

According to an aspect of the present invention, an accumulation type fuel injection system slackens combustion by controlling fuel injection performed by an injector when high-temperature combustion is predicted by high-temperature combustion predicting means. Thus, noise generated by the high-temperature combustion can be alleviated.

More specifically, the noise, which is caused by the high-temperature combustion when an actual common rail pressure is higher than a target pressure suitable for an operating state, can be alleviated without causing an increase in a number of parts or degradation of mounting performance due to addition of the pressure reduction valve.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

FIG. 5 is a characteristic map used in injector control for slackening combustion by the fuel injection system according to the first embodiment;

DETAILED DESCRIPTION OF THE REFERRED EMBODIMENTS

First Embodiment

Figure 1:
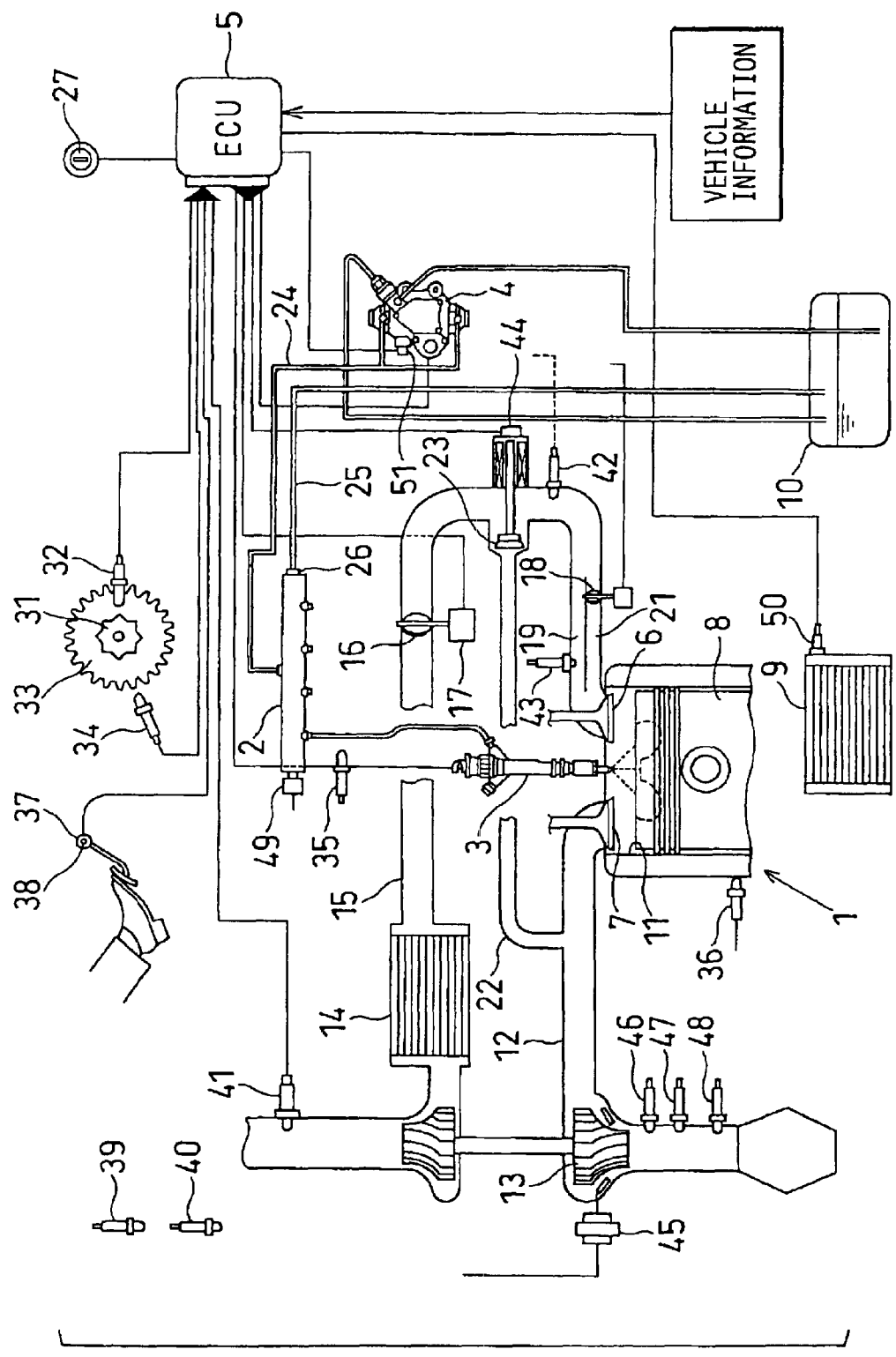
FIG. 1 is a schematic diagram showing an accumulation type fuel injection system of a first embodiment of the present invention.

Referring to FIG. 1, an accumulation type fuel injection system according to the first embodiment of the present invention is illustrated. As shown in FIG. 1, the accumulation type fuel injection system of the present embodiment is a system for injecting fuel into an internal combustion engine (an engine, hereafter) 1 such as a four-cylinder diesel engine. The accumulation type fuel injection system has a common rail 2, injectors 3, a supply pump 4, an engine control unit (ECU) 5, and the like. The common rail 2 is a high-pressure vessel for accumulating the fuel at a high pressure corresponding to a fuel injection pressure. The injectors 3 inject the fuel accumulated in the common rail 2 into respective cylinders of the engine 1. The supply pump 4 pressurizes drawn fuel and pressure-feeds the high-pressure fuel to the common rail 2. The ECU 5 corresponds to a control device for electronically controlling the injectors 3 and the supply pump 4 in accordance with an operating state of a vehicle.

An intake port of each cylinder of the engine 1 is opened or closed by an intake valve 6. An exhaust port of the cylinder is opened or closed by an exhaust valve 7. A piston 8 of each cylinder is connected with a crankshaft through a connecting rod (a con-rod). The piston 8 transmits combustion energy generated in a combustion chamber to the crankshaft in the form of rotational energy.

A radiator 9 for radiating the heat of engine cooling water is disposed in an area exposed to wind, which the vehicle catches during the travel, in an engine room accommodating the engine 1. A cooling water temperature sensor 50 for sensing the engine cooling water temperature is mounted to the radiator 9.

During the operation of the engine 1, the exhaust gas generated in the combustion in a cylinder 11 flows through an exhaust pipe 12 and functions as driving source of a variable geometry turbocharger (a VGT) 13. Then, the exhaust gas is discharged through a catalyst and a muffler. The VGT 13 is controlled based on signals of an intake pressure sensor, a supercharging pressure sensor 42 and a VGT position sensor 45. Intake air, which is supercharged (compressed) and heated, is cooled at an intercooler 14 and is introduced to the cylinder 11 through the intake port of the engine 1.

An intake throttle valve 16 is disposed in an intake pipe 15. The intake throttle valve 16 regulates a flow rate of intake air introduced into the respective cylinders 11 by opening or closing the intake passage of the intake pipe 15. An opening degree of the throttle valve 16 is regulated by an actuator 17, which operates based on a signal outputted by the ECU 5. A throttle position sensor for sensing the valve opening degree of the throttle valve 16 is mounted in the actuator 17.

A swirl control valve (an SCV) 18 is disposed near the intake port of the intake pipe 15. The SCV 18 operates based on a signal outputted from the ECU 5. The SCV 18 is disposed in a bypass passage 21 bypassing an intake passage 19, in which an intake temperature sensor 43 is disposed. The SCV 18 is energized and is opened when a load is heavy. The energization to the SCV 18 is stopped (OFF) to close the SCV 18 when the load is light.

An exhaust gas recirculation pipe (an EGR pipe) 22 is connected to the intake pipe 15. The EGR pipe 22 introduces part of the exhaust gas flowing through the exhaust pipe 12 into the intake pipe 15 as exhaust gas recirculation gas (EGR gas). An exhaust gas recirculation valve (as EGR valve.) 23 is disposed at a portion where the EGR pipe 22 merges into the intake pipe 15. The EGR valve 23 regulates a quantity of the EGR gas introduced to the intake pipe 15. Thus, the EGR gas is mixed into the intake air, which is taken into the cylinder 11, in order to inhibit generation of nitrogen oxides. The ECU 5 sets an opening degree of the EGR valve 23 for each operating state of the engine 1 so that the quantity of the EGR gas mixed into the intake air becomes appropriate. The opening degree of the EGR valve 23 is controlled to a predetermined value based on the signals from an intake quantity sensor 41, the intake temperature sensor 43, an exhaust gas oxygen sensor 46 and an EGR position sensor 44.

The common rail 2 is required to continuously accumulate the common rail pressure corresponding to the injection pressure. Therefore, the common rail 2 is connected with a discharge hole of the supply pump 4 through a high-pressure fuel pipe 24 so that the common rail 2 can accumulate the high common rail pressure. Leak fuel from the injectors 3 is returned to a fuel tank 10 through a leak pipe.

A pressure limiter 26 is disposed in a relief pipe (a fuel recirculation passage) 25 leading from the common rail 2 to the fuel tank 10. The pressure limiter 26 is a pressure safety valve, which opens when the fuel pressure in the common rail 2 exceeds a limit set pressure in order to limit the fuel pressure in the common rail 2 under the limit set pressure.

A common rail pressure sensor 49 for sensing the actual pressure NPC of the common rail 2 is mounted to the common rail 2. Thus, the ECU 5 monitors the actual pressure NPC.

The injectors 3 are fuel injection valves mounted to cylinders #1 to #4 of the engine 1 respectively. The injector 3 has a fuel injection nozzle, an actuator (an electromagnetic valve), biasing means such as a spring and the like. The fuel injection nozzle injects the high-pressure fuel into each cylinder. The actuator drives a nozzle needle in the fuel injection nozzle in a valve-opening direction. The biasing means biases the nozzle needle in a valve-closing direction. While the electromagnetic valve is open and the nozzle needle is positioned above, the high-pressure fuel accumulated in the common rail 2 is injected from the injector 3. As a period of energization to the electromagnetic valve is lengthened, a valve-opening period of the electromagnetic valve is lengthened and the injection quantity of the fuel injected from the injector 3 is increased. The injection quantity of the fuel injected from the injector 3 is increased as the actual pressure NPC of the common rail 2 increases.

The supply pump 4 is a high-pressure pump for pressure-feeding the high-pressure fuel to the common rail 2. The supply pump 4 has a feed pump for drawing the fuel from the fuel tank 10 to the supply pump 4. The supply pump 4 compresses the drawn fuel to a high pressure and pressure-feeds the compressed fuel to the common rail 2. The feed pump and the supply pump 4 are driven by a common camshaft. The camshaft is driven to rotate by an output shaft of the engine 1 such as a crankshaft.

A suction control valve (an electromagnetic open-close valve) is mounted to a fuel passage for introducing the fuel to a high-pressure pressurizing chamber of the supply pump 4. The suction control valve regulates the pressure of the common rail 2 by regulating an opening degree of the fuel passage. More specifically, the ECU 5 controls an opening degree of the suction control valve so that the actual pressure NPC sensed by the common rail pressure sensor 49 coincides with the target pressure Pfin calculated by the ECU 5.

The ECU 5 has functions of a CPU for performing various types of calculation processing, a memory device (a memory such as ROM, standby ROM, EEPROM or RAM) for storing various programs and data, an input circuit, an output circuit, a power source circuit, an injector driving circuit, a pump driving circuit and the like. Analog signals (voltage signals and the like) from various sensors are inputted to the memory device of the ECU 5 after the signals are converted from analog signals to digital signals by an A/D converter.

The ECU 5 performs the various types of calculation processing at the CPU based on the programs stored in the memory device and the signals (signals corresponding to the operating state of the engine 1) inputted from the sensors if an ignition is turned on with a key switch 27. Then, the ECU 5 electronically controls the various actuators based on the results of the calculation.

Cylinder determining means for respectively controlling the injectors 3 includes a signal rotor 31 and a cylinder determination sensor (an electromagnetic pickup) 32. The signal rotor 31 rotates in accordance with the rotation of the camshaft of the engine 1. For instance, the signal rotor 31 is a rotational body, which rotates once while the crankshaft rotates twice. The cylinder determination sensor 32 generates cylinder determination pulses in accordance with approach and separation between the cylinder determination sensor 32 and cylinder teeth (projections), which are disposed on a periphery of the signal rotor 31 in accordance with the respective cylinders.

Rotation speed sensing means for sensing a crank angle and engine rotation speed NE includes a signal rotor 33 and a crank angle sensor (electromagnetic pickup) 34. The signal rotor 31 rotates in accordance with the rotation of the camshaft of the engine 1. For instance, the signal rotor 33 is a rotational body, which rotates once while the crankshaft rotates once. The crank angle sensor 34 generates NE signal pulses in accordance with approach and separation between the crank angle sensor 34 and a multiplicity of crank angle detection teeth (projections) disposed on a periphery of the signal rotor 33. The ECU 5 detects the crank angle based on a count of the NE signal pulses from a reference position (for instance, a void in the teeth) and detects the engine rotation speed by measuring the time intervals of generations of the NE signal pulses.

The ECU 5 respectively controls the injectors 3 of the respective cylinders. The ECU 5 includes means for calculating optimum injection start timing (command injection timing) in accordance with the engine rotation speed NE and the accelerator position ACCP, based on a characteristic map, which is made in advance by measurement through experimentation and the like. The ECU 5 includes means for calculating an optimum basic injection quantity Q in accordance with the engine rotation speed NE and the accelerator position ACCP, based on a characteristic map, which is made in advance by measurement through experimentation and the like.

The ECU 5 includes means for calculating the target injection quantity Qfin by adding an injection correction value to the basic injection quantity Q. The fuel temperature THF sensed by a fuel temperature sensor 51, the engine cooling water temperature THW sensed by the cooling water temperature sensor 50 and the like are considered in the calculation of the injection correction value.

In the present embodiment, the injection start timing and the basic injection quantity Q are calculated in accordance with the engine rotation speed NE and the accelerator position ACCP. The target injection quantity Qfin is calculated in accordance with the fuel temperature THF and the cooling water temperature THW. Sensing signals (signals for sensing the operating state of the engine 1) from other sensors (a fuel leak temperature sensor 35, an oil temperature sensor 36, an accelerator position sensor 37, an idling position sensor 38, an atmospheric pressure sensor 39, an atmospheric temperature (ambient temperature) sensor 40, the intake quantity sensor 41, the supercharging pressure sensor 42, the intake temperature sensor 43, the EGR position sensor 44, the VGT position sensor 45, the exhaust gas oxygen sensor 46, an exhaust gas temperature sensor 47, an exhaust gas pressure sensor 48, the common rail pressure sensor 49, the throttle position sensor, the intake pressure sensor and the like) may be considered in the calculation of the target injection quantity Qfin, an injection mode, the injection timing and the target pressure Pfin.

The ECU 5 receives vehicle information such as a signal representing a gear position of a transmission, a signal of a depressed degree of a clutch pedal, an energization signal of a starter, a vehicle speed signal from a vehicle speed sensor, an electric load signal of an air conditioner, a head lump and the like, and a pump load signal of a compressor of the air conditioner, a power steering system, an oil pump and the like.

The accumulation type fuel injection system can perform a multi-step injection (a series of the injections including two or more injections) for injecting the fuel in plural times during one cycle of the engine 1, or while the crankshaft of the engine 1 rotates twice (through a crank angle of 72°), for each injector 3 of each cylinder of the engine 1. The one cycle of the engine 1 includes an intake stroke, a compression stroke, an expansion stroke (an explosion stroke), and an exhaust stroke in that order.

More specifically, the accumulation type fuel injection system can perform an injection in a pilot injection mode, an injection in a normal multi-injection mode and an injection in an after multi-injection mode, in addition to the injection in a main injection mode for performing only one main injection in one injection period. In the injection in the pilot injection mode, a minute injection (a pilot injection) is performed before the main injection. In the injection in the normal multi-injection mode, a plurality of minute injections is performed before and after the main injection. In the injection in the after multi-injection mode, a plurality of minute injections is performed after the main injection.

Therefore, the ECU 5 determines the injection mode in accordance with the operating state of the engine 1. More specifically, the ECU 5 includes injection mode determining means for determining the optimum injection mode in accordance with the engine rotation speed NE and the accelerator position ACCP, based on a characteristic map, which is made in advance by measurement through experimentation and the like.

The ECU 5 includes multi-step injection quantity calculating means for calculating a minute injection quantity (an injection quantity of the minute injection) and a main injection quantity (an injection quantity of the main injection) in accordance with the operating state of the engine 1 when the ECU 5 performs the multi-step injection.

More specifically, the ECU 5 includes means for calculating the minute injection quantity QPILOT in accordance with the engine rotation speed NE and the target injection quantity Qfin, based on a characteristic map, which is made in advance by measurement through experimentation and the like, and for calculating the main injection quantity QMAIN by subtracting the minute injection quantity QPILOT from the target injection quantity Qfin when the ECU 5 performs the injection in the pilot injection mode. The ECU 5 includes means for calculating the minute injection quantities QMINI for the plurality of minute injections in accordance with the engine rotation speed NE and the target injection quantity Qfin, based on a characteristic map, which is made in advance by measurement through experimentation and the like, and for calculating the main injection quantity QMAIN by subtracting the sum of the minute injection quantities QMINI from the target injection quantity Qfin when the ECU 5 performs the injection in the multi-injection mode.

The ECU 5 includes interval calculating means for calculating an interval between the fuel injections in one injection period in accordance with the operating state of the engine 1 when the ECU 5 performs the multi-step injection.

More specifically, the ECU 5 includes means for calculating an interval (a pilot interval) between the minute injection and the main injection in accordance with the engine rotation speed NE and the target injection quantity Qfin, based on a characteristic map, which is made in advance by measurement through experimentation and the like, when the ECU 5 performs the injection in the pilot injection mode. The ECU 5 includes means for calculating intervals (minute injection intervals) among the plurality of minute injections and an interval (a main interval) between the main injection and the minute injection performed immediately after or before the main injection in accordance with the engine rotation speed NE and the target injection quantity Qfin, based on a characteristic map, which is made in advance by measurement through experimentation and the like, when the ECU 5 performs the injection in the multi-injection mode.

The ECU 5 includes means for calculating a minute injection period in accordance with the minute injection quantity and the actual pressure NPC, based on a characteristic map, which is made in advance by measurement through experimentation and the like, and for calculating a main injection period in accordance with the main injection quantity and the actual pressure NPC, based on a characteristic map, which is made in advance by measurement through experimentation.

The ECU 5 includes means for calculating an optimum basic pressure P in the common rail 2 in accordance with the target injection quantity Qfin and the engine rotation speed NE, based on a characteristic map, which is made in advance by measurement through experimentation and the like, and for calculating a target pressure Pfin by adding an injection pressure, in which the fuel temperature THF, the engine cooling water temperature THW and the like are considered, to the basic pressure P. The ECU 5 includes means for controlling the actual pressure NPC sensed by the common rail pressure sensor 49 to the target pressure Pfin by driving and controlling the suction control valve of the supply pump 4.

The ECU 5 controls the discharging quantity of the supply pump 4, which supplies the high-pressure fuel to the common rail 2, in order to maintain the actual pressure NPC of the common rail 2 at the target pressure Pfin. More specifically, the supply pump 4 can increase the actual pressure NPC of the common rail 2 to the target pressure Pfin. If the pressure reduction of the common rail 2 is required, the supply pump 4 can stop the fuel discharge. However, the supply pump 4 cannot reduce the pressure of the common rail 2 actively.

Figure 2:
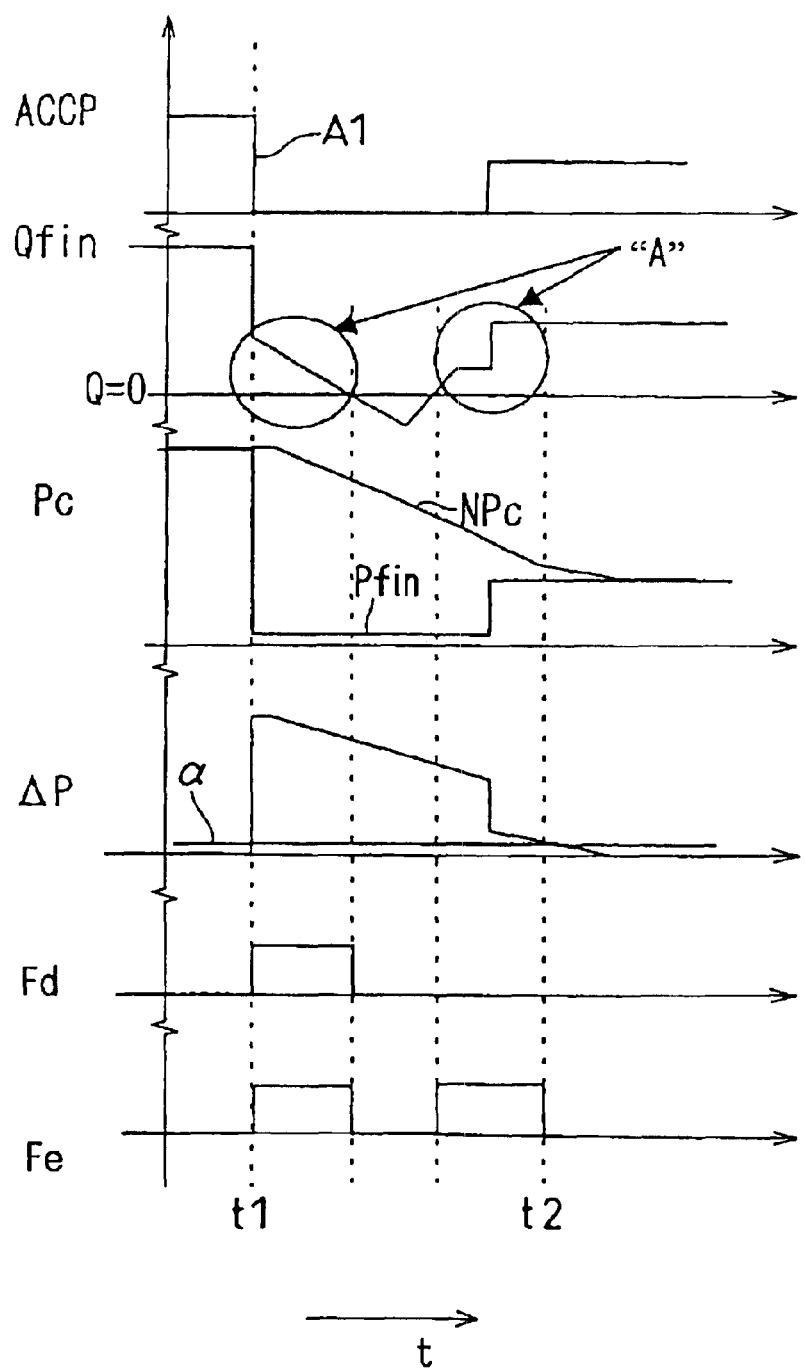
FIG. 2 is a time chart showing an operation of the fuel injection system according to the first embodiment.

When the vehicle is decelerated from a high-speed traveling state as shown by a time point A1 in FIG. 2, fuel injection under a low pressure is required abruptly in a state in which the fuel injection has been performed at a high speed and under a high pressure, or the target pressure Pfin is decreased from a high value to a low value abruptly as shown in FIG. 2. In FIG. 2, Pc represents the common rail pressure and Fd is a deceleration determination flag. However, the fuel injection is performed from the injector 3 in a state in which the actual common rail NPC is higher than the normally required target pressure Pfin, or in a state in which the pressure difference ΔP therebetween is large, until the actual pressure NPC is decreased to the low pressure through the injection or the fuel leak from the injector 3, during a period t1 to t2 in FIG. 2.

Under the condition that the actual pressure NPC is higher than the target pressure Pfin, the injection period is extremely contracted, and the noise is generated by the combustion in which a large amount of heat is generated in a short period. The high-temperature combustion is not preferable for performance of the vehicle.

Figure 3:
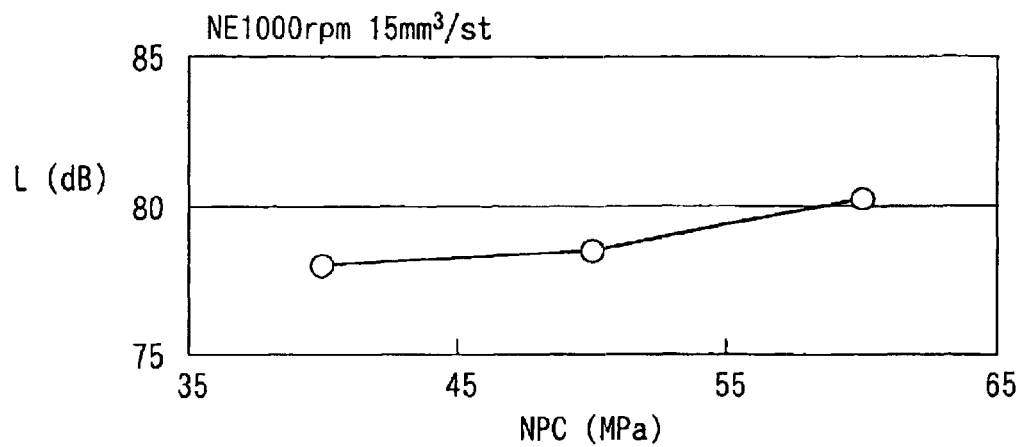
FIG. 3 is a graph showing a relationship between a common rail pressure and a noise level in the fuel injection system according to the first embodiment.

A relationship between the actual pressure NPC of the common rail 2 and the noise level L under a specific condition of the engine 1 (predetermined conditions of the engine rotation speed NE and the injection quantity) is shown in FIG. 3. As shown in FIG. 3, the noise level L increases as the actual pressure NPC increases.

Therefore, the ECU 5 of the present embodiment includes high-temperature combustion predicting means for predicting the generation of the high-temperature combustion in the respective cylinders of the engine 1. The ECU 5 includes combustion slackening means for slackening the combustion by controlling the fuel injection through the injector 3 if the high-temperature combustion is predicted.

The high-temperature combustion predicting means of the present embodiment predicts the generation of the high-temperature combustion in the engine 1 under a condition that a pressure difference ΔP provided by subtracting the target pressure Pfin from the actual pressure NPC is greater than a predetermined determination threshold (a solid line a in FIG. 2) and the fuel injection is performed through the injector 3, or the target injection quantity Qfin is greater than zero. If the condition is established, the ECU 5 raises an execution flag Fe as shown by a line Fe in FIG. 2 and performs the control for slackening the combustion.

The combustion slackening means of the present embodiment performs the control for slackening the combustion by increasing a number of the injections performed by the injector 3 in one injection period from a normal injection number when the high-temperature combustion predicting means predicts the high-temperature combustion, or when the execution flag Fe is raised.

More specifically, if a normal injection mode, which is normally determined by the injection mode determining means, is the main injection mode, the injection mode is changed to the pilot injection mode or the multi-injection mode. If the normal injection mode determined by the injection mode determining means is the pilot injection mode, the injection mode is changed to the multi-injection mode. If the normal injection mode determined by the injection mode determining means is the multi-injection mode, the injection mode is changed to a multi-injection mode, in which the number of the minute injections is increased. The injection mode is changed in areas "A" in FIG. 2.

Figure 4A:
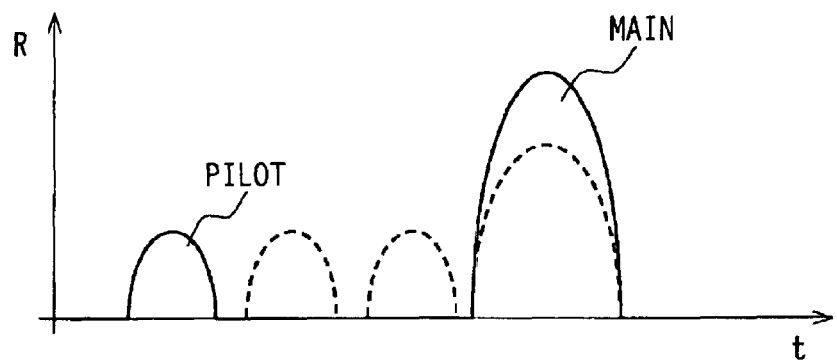
FIG. 4A is a diagram showing an increase in a number of injections in the fuel injection system according to the first embodiment.

More specifically, if the injection mode determined by the injection mode determining means is the pilot injection mode as shown by a solid line in FIG. 4A when the high-temperature combustion is predicted, the number of the minute injections is increased so that the injection mode is changed to the multi-injection mode as shown by a broken line in FIG. 4A. In FIG. 4A, R represents an injection ratio.

A total injection quantity in one injection period is maintained at the target injection quantity Qfin and is not changed even if the number of the minute injections is increased. Therefore, the ECU 5 decreases the main injection quantity by an increase in a total injection quantity of the minute injections, whose number is increased.

The combustion slackening means of the ECU 5 increases the number of the injections through the injector 3 as the pressure difference ΔP provided by subtracting the target pressure Pfin from the actual pressure NPC increases. More specifically, in the case where the injection mode determined by the injection mode determining means is the main injection mode, in accordance with the increase in the pressure difference ΔP, the injection mode is changed to the pilot injection mode, to the multi-injection mode including two minute injections, and then, to the multi-injection mode including three minute injections, so the number of the injections is increased.

The specific number of the injections is determined in accordance with the pressure difference ΔP and the engine rotation speed NE, based on a characteristic map shown in FIG. 5, which is made in advance by measurement through experimentation and the like.

Alternatively, the specific number of the injections may be determined in accordance with the actual pressure NPC and the engine rotation speed NE, based on a characteristic map (shown in FIG. 5), which is made in advance by measurement through experimentation and the like. Alternatively, the number of the injections may be determined in accordance with the target injection quantity Qfin and the engine rotation speed NE, based on a characteristic map (shown in FIG. 5), which is made in advance by measurement through experimentation and the like.

Figure 6:
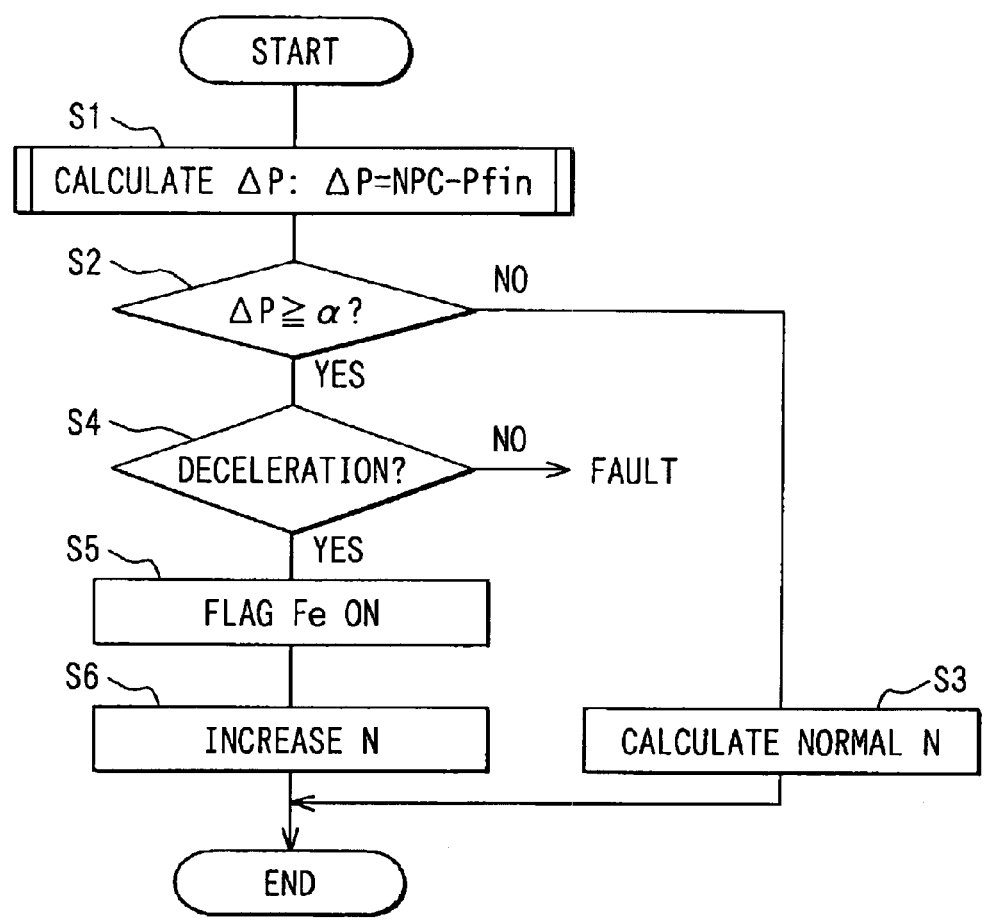
FIG. 6 is a flowchart of combustion slackening control of the fuel injection system according to the first embodiment.

Next, a flowchart of the combustion slackening control will be explained based on FIG. 6.

If the processing enters the flow of the combustion slackening control (START), the pressure difference ΔP is calculated by subtracting the target pressure Pfin from the actual pressure NPC in Step S1.

Then, it is determined whether the pressure difference ΔP calculated in Step S1 is greater than the determination threshold α or not in Step S2.

If the result of the determination in Step S2 is "NO", a normal injection mode is determined in Step S3. More specifically, the number of the injections is determined based on a normal injection map for the normal injection mode.

If the result of the determination in Step S2 is "YES", it is determined whether the vehicle is in a decelerating state or not based on the target injection quantity Qfin, the change in the accelerator position ACCP and the like in Step S4. If the result of the determination in Step S4 is "NO", there is a possibility that some faults are generated in the sensors. In this case, the processing proceeds to a routine for performing fault determination and the like.

If the result of the determination in Step S4 is "YES", the generation of the high-temperature combustion in the engine 1 is predicted. In this case, in order to reduce the combustion noise, the multi-injection execution flag Fe is turned on to increase the number of the injections in one injection period in Step S5.

Subsequently, the injection mode, which provides a greater number of the injections than the number of the injections normally determined by the injection mode determining means, is determined in Step S6. More specifically, as explained above, the number of the injections is determined in accordance with the operating state of the engine 1 detected by the sensors, based on the characteristic map shown in FIG. 5.

Then, the processing returns to a normal injection control routine (END), and the injection control of the injector 3 is performed.

The accumulation type fuel injection system of the first embodiment increases the number of the injections in one injection period if the ECU 5 predicts the high-temperature combustion. Thus, the combustion is slackened and the noise caused by the high-temperature combustion can be alleviated.

Figure 4B:
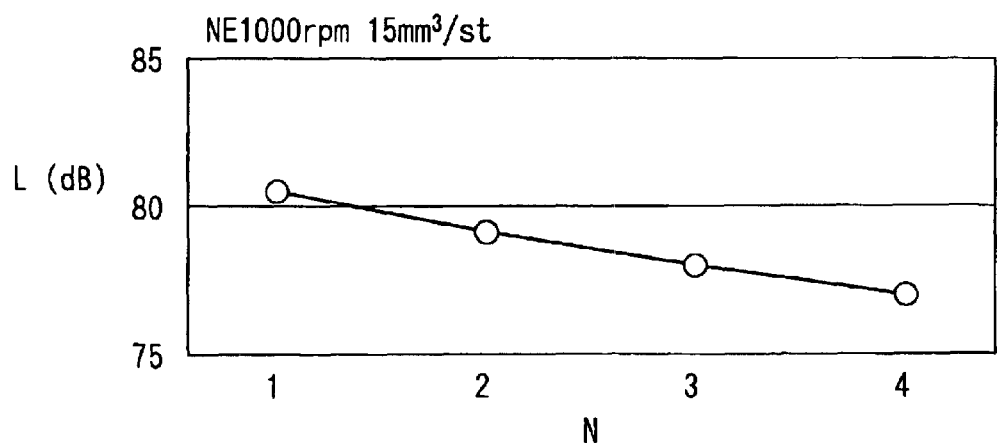
FIG. 4B is a graph showing a relationship between the number of the injections and the noise level in the fuel injection system according to the first embodiment.

A relationship between the number N of injections and the noise level L under a specific operating condition of the engine 1 (predetermined conditions of the engine rotation speed NE and the injection quantity) is shown in FIG. 4B. As shown in FIG. 4B, the noise level L is reduced as the number N of the injections is increased.

Thus, the accumulation type fuel injection system of the present embodiment can alleviate the noise due to the high-temperature combustion, even if the pressure reducing valve (means for quickly reducing the pressure of the common rail 2) explained in the related art is not mounted. Therefore, the degradation in the mounting performance caused when the pressure reducing valve is mounted to the common rail 2 or the high-pressure fuel pipe 24 can be prevented. Meanwhile, an increase in the cost due to the addition of the pressure reducing valve or due to an increase in the assembling process can be prevented.

In the technology of performing the invalid injection with the injector 3 explained in the related art, the common rail pressure is reduced gradually. Therefore, the pressure difference ΔP cannot be reduced quickly. As a result, there is a problem that the noise is generated by the high-temperature combustion in the early stage of the pressure reduction. On the contrary, such a problem is not caused in the present embodiment.

Second Embodiment

Next, an accumulation type fuel injection system according to the second embodiment will be explained based on FIGS. 7 and 8.

Figure 7A:
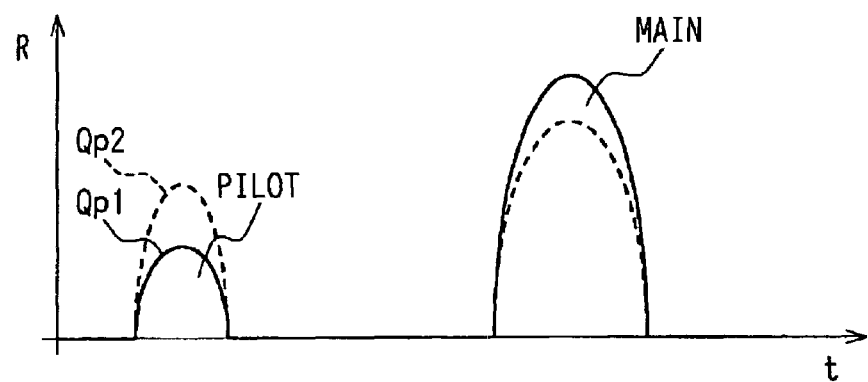
FIG. 7A is a diagram showing an increase in a pilot injection quantity in an accumulation type fuel injection system according to a second embodiment of the present invention.
Figure 8:
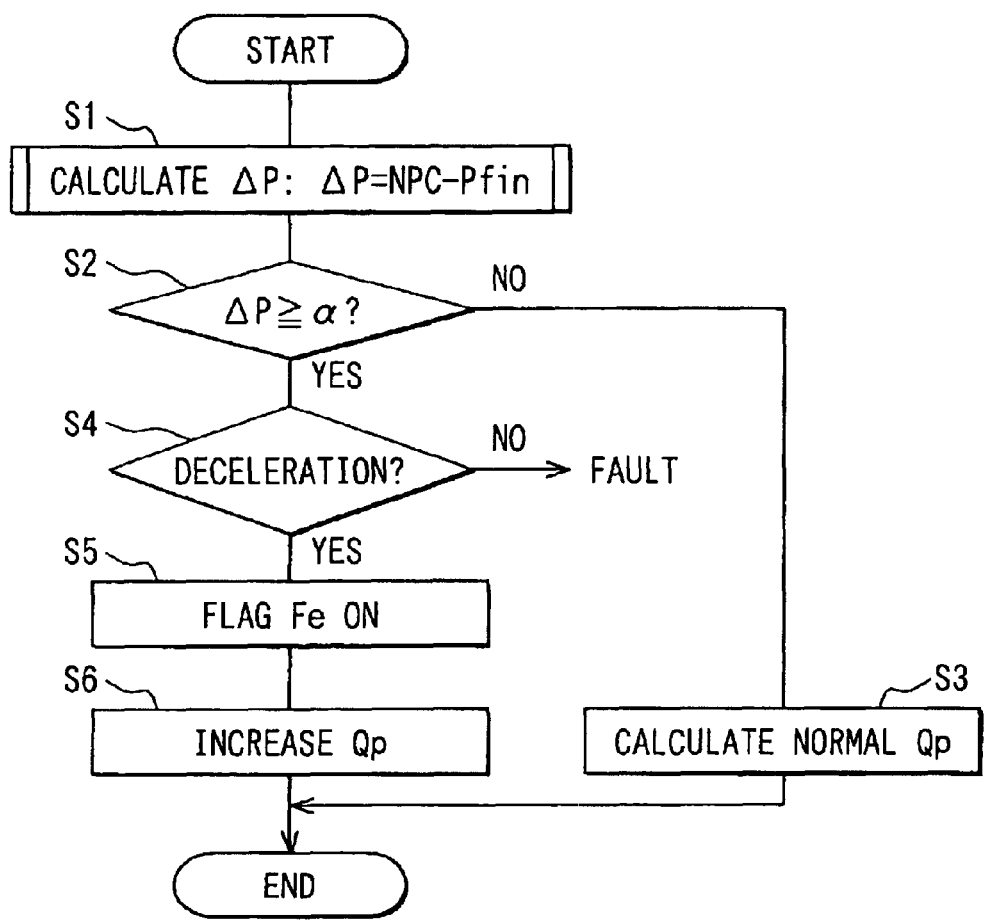
FIG. 8 is a flowchart showing combustion slackening control of the fuel injection system according to the second embodiment.

Combustion slackening means of the second embodiment slackens the combustion by setting the injection mode to the multi-step injection mode (the pilot injection mode or the multi-injection mode) so that the injection quantity of the minute injection is increased from the injection quantity of the minute injection in the normal injection mode as shown by a solid line Qp1 and a broken line Qp2 in FIG. 7A. The solid line Qp1 in FIG. 7A represents an injection ratio in the normal injection mode. The broken line Qp2 in FIG. 7A represents an injection ratio in the corrected injection mode. The main injection quantity is decreased by the increase in the injection quantity of the minute injection as shown in FIG. 7A.

The combustion slackening means of the present embodiment increases the injection quantity of the minute injection as the pressure difference ΔP provided by subtracting the target pressure Pfin from the actual pressure NPC increases. More specifically, a correction coefficient K, which increases as the pressure difference ΔP increases, is calculated with a formula or a map, and then, the minute injection quantity is increased by multiplying the minute injection quantity by the correction coefficient K. Thus, pressure correction corresponding to the pressure difference ΔP is added to the minute injection quantity.

Alternatively, the minute injection quantity greater than the minute injection quantity in the normal injection mode may be set in accordance with the pressure difference ΔP and the engine rotation speed NE, based on a characteristic map (shown in FIG. 5), which is made in advance by measurement through experimentation and the like. Alternatively, the minute injection quantity greater than the minute injection quantity in the normal injection mode may be set in accordance with the actual pressure NPC and the engine rotation speed NE, based on a characteristic map (shown in FIG. 5), which is made in advance by measurement through experimentation and the like. Alternatively, the minute injection quantity greater than the minute injection quantity in the normal injection mode may be set in accordance with the target injection quantity Qfin and the engine rotation speed NE, based on a characteristic map (shown in FIG. 5), which is made in advance by measurement through experimentation and the like.

Next, a flowchart of the combustion slackening control according to the second embodiment will be explained based on FIG. 8. The steps from Step S1 to Step S5 are the same as the first embodiment.

After the multi-step injection execution flag Fe is turned on in Step S5, the minute injection quantity Qp, which is greater than the normal minute injection quantity Qp that is normally determined by the multi-step injection quantity calculating means, is determined in Step S6. More specifically, the correction coefficient K corresponding to the pressure difference ΔP is calculated with the formula or the map, and then, the minute injection quantity Qp greater than the normal minute injection quantity Qp is calculated by multiplying the value of the minute injection quantity Qp by the correction coefficient K. The main injection quantity is decreased by the increase in the minute injection quantity Qp so that the total injection quantity injected in one injection period is equal to the target injection quantity Qfin.

If the ECU 5 predicts the high-temperature combustion, the accumulation type fuel injection system of the second embodiment performs the multi-step injection (the injection in the pilot injection mode or the injection in the multi-injection mode), in which the minute injection quantity Qp is increased from the normal minute injection quantity Qp. Thus, the combustion is slackened and the noise due to the high-temperature combustion cab be alleviated.

Figure 7B:
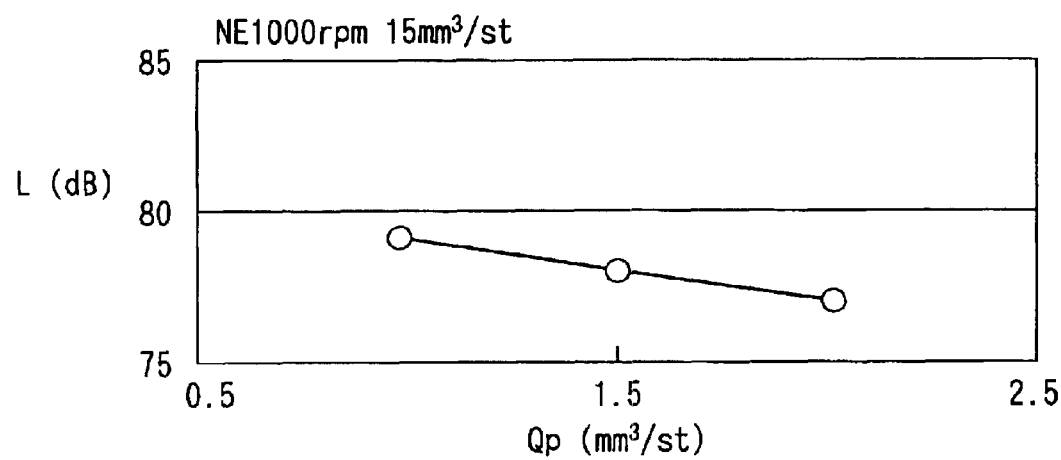
FIG. 7B is a graph showing a relationship between a pilot injection quantity and a noise level in the fuel injection system according to the second embodiment.

A relationship between the pilot injection quantity Qp (an example of the minute injection quantity) and the noise level L under a specific condition of the engine 1 (predetermined conditions of the engine rotation speed NE and the injection quantity) is shown in FIG. 7B. As shown in FIG. 7B, the noise level L decreases as the pilot injection quantity Qp (the minute injection quantity) is increased.

Thus, the accumulation type fuel injection system of the second embodiment can exert an effect similar to the effect of the first embodiment.

Third Embodiment

Next, an accumulation type fuel injection system according to the third embodiment of the present invention will be explained based on FIGS. 9 and 10.

Figure 9A:
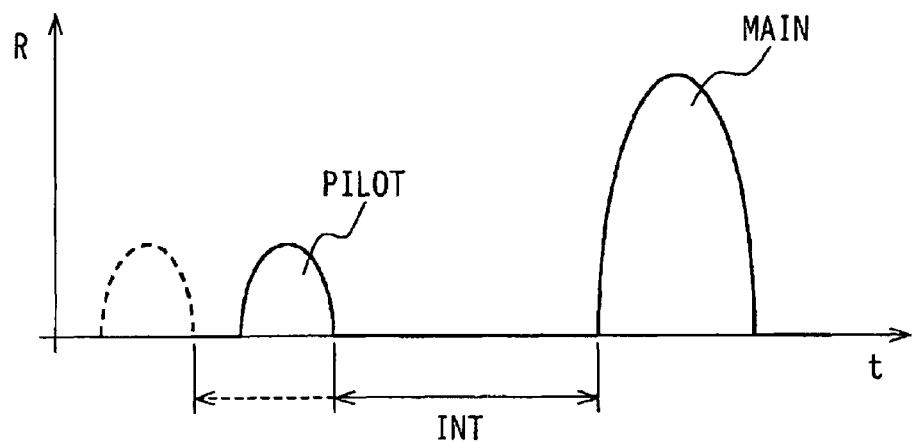
FIG. 9A is a diagram showing an increase in a pilot interval in an accumulation type fuel injection system according to a third embodiment of the present invention.
Figure 9B:
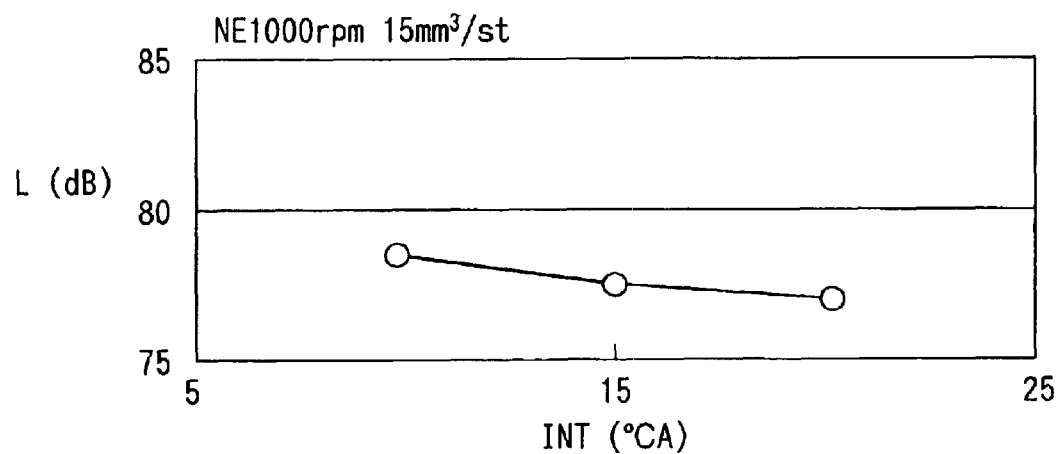
FIG. 9B is a graph showing a relationship between the pilot interval and a noise level in the fuel injection system of the third embodiment.
Figure 10:
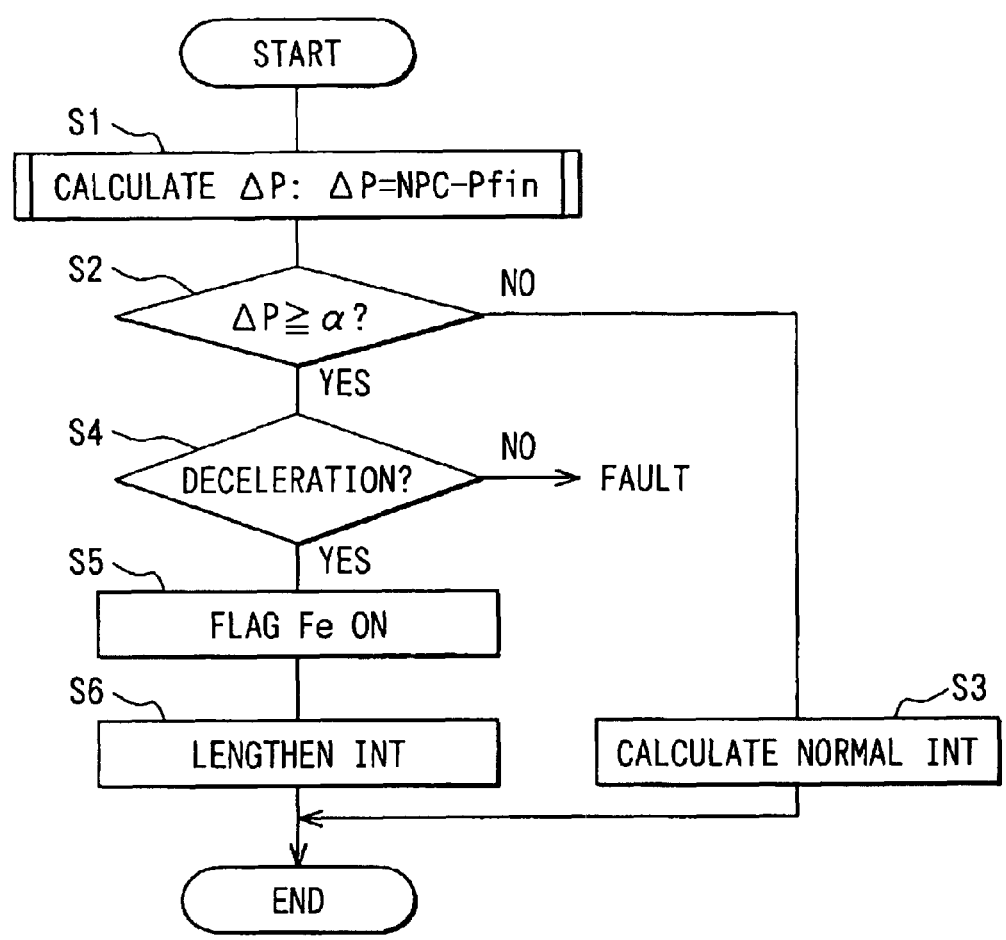
FIG. 10 is a flowchart of combustion slackening control of the fuel injection system according to the third embodiment.

Combustion slackening means of the third embodiment slackens the combustion by performing the minute injection and the main injection in one injection period through the injector 3 and by lengthening an interval INT between the injections in one injection period as shown by broken lines in FIG. 9A from a normal injection interval shown by solid lines in FIG. 9B.

The combustion slackening means of the present embodiment lengthens the injection interval INT in one injection period as the pressure difference ΔP provided by subtracting the target pressure Pfin from the actual pressure NPC increases. More specifically, the combustion slackening means calculates a correction coefficient K corresponding to the pressure difference ΔP with a formula or a map and increases the injection interval INT by multiplying the value of the injection interval by the correction coefficient K. Thus, pressure correction corresponding to the pressure difference ΔP is added to the injection interval INT.

Alternatively, the injection interval INT longer than the normal injection interval INT may be set in accordance with the pressure difference ΔP and the engine rotation speed NE, based on a characteristic map (shown in FIG. 5), which is made in advance by measurement through experimentation and the like. Alternatively, the injection interval INT longer than the normal injection interval INT may be set in accordance with the actual pressure NPC and the engine rotation speed NE, based on a characteristic map (shown in FIG. 5), which is made in advance by measurement through experimentation and the like. Alternatively, the injection interval INT longer than the normal injection interval INT may be set in accordance with the target injection quantity Qfin and the engine rotation speed NE, based on a characteristic map (shown in FIG. 5), which is made in advance by measurement through experimentation and the like.

Next, a flowchart of the combustion slackening control of the third embodiment will be explained based on FIG. 10. Steps from Step S1 to Step S5 are the same as the first embodiment.

After the multi-step injection execution flag Fe is turned on in Step S5, the interval calculating means calculates the injection interval INT longer than the normal injection interval, which is the injection interval normally determined by the interval calculating means, in Step S6. More specifically, the correction coefficient K corresponding to the pressure difference ΔP is calculated with the formula or the map and the injection interval INT longer than the normal injection interval INT is calculated by multiplying the value of the injection interval INT by the correction coefficient K.

If the ECU 5 predicts the high-temperature combustion, the accumulation type fuel injection system of the third embodiment performs the multi-step injection (the injection in the pilot injection mode or the multi-injection mode) and lengthens the injection interval INT from the normal injection interval INT. Thus, the combustion is slackened and the noise due to the high-temperature combustion can be alleviated.

A relationship between the pilot interval INT (an example of the injection interval INT in the multi-step injection) and the noise level L under a specific condition of the engine 1 (predetermined conditions of the engine rotation speed NE and the injection quantity) is shown in FIG. 9B. As shown in FIG. 9B, the noise level L decreases as the pilot interval INT is lengthened.

Thus, the accumulation type fuel injection system of the third embodiment can exert an effect similar to the effect of the first embodiment.

Modification

As means for slackening the combustion when the high-temperature combustion is predicted, the means of the first to third embodiments may be combined ad libitum.

The present invention should not be limited to the disclosed embodiments, but may be implemented in many other ways without departing from the spirit of the invention.

What is claimed is:

1. An accumulation type fuel injection system, comprising:
   a common rail for accumulating high-pressure fuel;
   an injector for injecting the high-pressure fuel accumulated in the common rail; and
   controlling means for controlling the injector in accordance with an operating state of an engine, wherein
   the controlling means includes high-temperature combustion predicting means for predicting generation of high-temperature combustion in the engine, and
   the controlling means includes combustion slackening means for slackening the combustion in the engine by controlling the fuel injection through the injector when the high-temperature combustion is predicted by the high-temperature combustion predicting means.

2. The accumulation type fuel injection system as in claim 1, wherein the combustion slackening means slackens the combustion by increasing a number of the injections performed with the injector in one injection period without changing total injection quantity, when the high-temperature combustion is predicted by the high-temperature combustion predicting means.

3. The accumulation type fuel injection system as in claim 1, wherein the combustion slackening means slackens the combustion by performing a minute injection and a main injection through the injector in one injection period, by increasing injection quantity of the minute injection and by decreasing injection quantity of the main injection by the increase in the injection quantity of the minute injection, when the high-temperature combustion is predicted by the high-temperature predicting means.

4. The accumulation type fuel injection system as in claim 1, wherein the combustion slackening means slackens the combustion by performing a minute injection and a main injection through the injector in one injection period and by lengthening an interval between the fuel injections in the one injection period when the high-temperature combustion is predicted by the high-temperature combustion predicting means.

5. The accumulation type fuel injection system as in claim 2, wherein the combustion slackening means performs correction for increasing the number of the injections through the injector if a pressure difference provided by subtracting target pressure suitable for the operating state of the engine from the actual pressure of the common rail exceeds a predetermined value.

6. The accumulation type fuel injection system as in claim 2, wherein the combustion slackening means performs correction for increasing the number of injections through the injector as a basic injection quantity or a target injection quantity suitable for the operating state of the engine increases.

7. The accumulation type fuel injection system as in claim 3, wherein the combustion slackening means performs correction for increasing the injection quantity of the minute injection if a pressure difference provided by subtracting target pressure suitable for the operating state of the engine from the actual pressure of the common rail exceeds a predetermined value.

8. The accumulation type fuel injection system as in claim 3, wherein the combustion slackening means performs correction for increasing the injection quantity of the minute injection as a basic injection quantity or a target injection quantity suitable for the operating state of the engine increases.

9. The accumulation type fuel injection system as in claim 4, wherein the combustion slackening means performs correction for lengthening the interval between the fuel injections if a pressure difference provided by subtracting target pressure suitable for the operating state of the engine from the actual pressure of the common rail exceeds a predetermined value.

10. The accumulation type fuel injection system as in claim 4, wherein the combustion slackening means performs correction for lengthening the interval between the fuel injections as a basic injection quantity or a target injection quantity suitable for the operating state of the engine increases.

11. The accumulation type fuel injection system as in claim 1, wherein the high-temperature predicting means predicts the generation of the high-temperature combustion in the engine if a pressure difference provided by subtracting target pressure suitable for the operating state of the engine from actual pressure of the common rail is greater than a predetermined determination threshold and a condition for performing the fuel injection through the injector is established.

* * * * *